2,863,867
STABILIZATION OF SULFENAMIDES

Herman Cherlow, Plainfield, N. J., assignor to American Cyanamid Company, New York, N. Y., a corporation of Maine No Drawing. Application November 6, 1957
Serial No. 694,712

16 Claims. (Cl. 260—247.1)

This invention relates to sulfenamides. More particularly, it relates to a method for inhibiting the deterioration of sulfenamides and the stabilized compositions thus obtained.

Sulfenamides, in general, and particularly benzothiazolesulfenamides, have found general use as accelerators in the rubber industry. A number of these have achieved considerable commercial importance as accelerators among which may be mentioned as illustrative N-oxydiethylenebenzothiazolesulfenamide, N-cyclohexylbenzothiazolesulfenamide, N-tertiarybutylbenzothiazolesulfenamide and diisopropylbenzothiazolesulfenamide. Sulfenamides, however, are inherently unstable in varying degrees. Accordingly, even though exhibiting accelerating activity, they suffer from the common disadvantage that on storage for even normal periods of time they are subject to decomposition. The resulting decomposition products may adversely influence the accelerating action of the sulfenamide and/or affect the vulcanization reaction. Even if they do neither of these, however, the decomposition is undesirable since it represents a loss of sulfenamide accelerator.

It is, therefore, the principal object of this invention to provide a method for stabilizing sulfenamides, particularly benzothiazolesulfenamides, against decomposition. It is a further object of this invention to provide storage stable sulfenamide compositions. It is a still further object of this invention to provide such compositions without adversely influencing the accelerating activity of the sulfenamide or affecting the process of vulcanization.

In accordance with this invention, these objects have been met in an effective yet surprisingly simple manner. It has now been found that a substantially storage stable sulfenamide composition may be obtained by the addition to the sulfenamide of a small amount of a phenol which may be represented by the following structures:

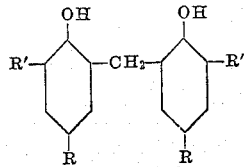

and

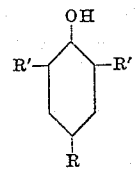

in which R is a lower alkyl radical and R' is a t-alkyl radical. While R and R' may be widely varied, it has been found that the bis-dialkyl phenols and bis-t-alkyl-4-alkyl phenols in which R is from 1–3 carbon atoms and R' is from 4–8 carbon atoms are the most effective.

Both the methylene-bis-dialkyl phenols and the bis-t-alkyl-4-alkyl phenols are known compounds and may be readily prepared by known methods. These compounds, moreover, are known to exhibit antioxidant properties, and certain of the bis-dialkyl phenols are particularly outstanding in this respect when used in vulcanized rubber. For this reason, the present invention is particularly unusual inasmuch as any inhibitor that may be present at the time of vulcanization may serve in a secondary capacity as an antioxidant for the rubber. While there is no intention to limit this invention by any particular theory of operation, it does not appear that the inhibiting action of the phenols is dependent on their known antioxidant properties. Other effective rubber antioxidants show little if any inhibiting properties and, in some instances, not only do not stabilize the sulfenamide but actually accelerate its decomposition. The process of this invention, therefore, is unexpected in that the unusual stabilizing activity of the present inhibitors could not be predicted from its known properties.

The amount of phenolic inhibitor required to obtain the desired stabilization of sulfenamides in accordance with this invention may be quite widely varied. It may be influenced by both the particular phenol employed as well as the particular sulfenamide being treated since the stabilization activity of the phenols varies as does the tendency of the sulfenamides to decompose. In general, however, it can be said that as little as 0.5% on the weight of the sulfenamide will exhibit a stabilizing influence. This may be considerably increased to as much as 10% and even higher. Beyond about 10%, however, little, if any, additional stabilizing effect is obtained. In addition, excessive amounts may adversely affect the accelerating activity of the sulfenamide. Usually, about 1–5% on the weight of the sulfenamide will be found adequate to provide the stabilizing effect desired.

The following examples further illustrate the invention. All parts are by weight unless otherwise indicated. Extent of decomposition is determined by analyzing for sulfenamide content directly or determining this by analyzing for methanol insolubles which includes the impurities but not the sulfenamide.

EXAMPLE 1

A portion of N,N-diisopropylbenzothiazolesulfenamide is divided into two equal samples to one of which is added 1% on the weight of sulfenamide of 2,2'-methylene-bis-(4-methyl-6-t-butylphenol) and both samples then assayed. After heating at 75° C. for 12 hours, the samples are cooled, assayed and then allowed to stand at room temperature for 119 days after which they are again assayed. Assay results appear in Table I.

Table I

| Inhibitor | Percent N,N-Diisopropylbenzothiazole sulfenamide | | |
|---|---|---|---|
| | Original Assay | Assay after 12 Hours | Assay after 119 Days |
| Blank | 97.0 | 97.0 | 90.7 |
| 2,2'-Methylene-bis-(4-methyl-6-t-butyl phenol) | 96.0 | 96.0 | 94.0 |

EXAMPLE 2

A portion of flaked N,N-diisopropylbenzothiazolesulfenamide is divided into three samples, inhibitors added according to Table II and the samples assayed. After storage at 110–115° F. for 4 weeks, the samples are again assayed. Assay results appear in Table II.

Table II

| Inhibitor | Amount, percent | Percent N,N-Diisopropylbenzothiazole sulfenamide | |
|---|---|---|---|
| | | Original Assay | Assay after 4 weeks |
| None | | 99.6 | 96.1 |
| 2,2'-Methylene-bis-(4-methyl-6-t-butyl phenol) | 2.0 | 97.9 | 96.9 |
| 2,2'-Methylene-bis-(4-ethyl-6-t-butyl phenol) | 2.0 | 97.9 | 96.9 |

EXAMPLE 3

A portion of N-oxydiethylenebenzothiazolesulfenamide is divided into two samples to one of which 3% by weight of 2,2'-methylene-bis-(4-methyl-6-t-butylphenol) is added and the samples assayed. The samples are then permitted to stand for 60 days with assays being made at the end of 30 days and also at the end of 60 days. Results which appear in Table III are percentages of methanol insolubles, an excellent measure of the presence of decomposition products. The lower the value, the more stable the product.

Table III

| Inhibitor | Percent Methanol Insolubles | | |
|---|---|---|---|
| | Original Assay | 30 Day Assay | 60 Day Assay |
| None | 0.21 | 1.25 | 1.42 |
| 2,2'-Methylene-bis-(4-methyl-6-t-butyl phenol) | 0.05 | 0.69 | 1.01 |

EXAMPLE 4

A portion of N-oxydiethylenebenzothiazolesulfenamide is divided into two samples and 2½% of 2,2'-methylene-bis-(4-ethyl-6-t-butylphenol) added to one. Initial and 30 day assays for methanol insolubles appear in Table IV.

Table IV

| Inhibitor | Percent Methanol Insolubles | |
|---|---|---|
| | Original Assay | 30 Day Assay |
| None | 0.32 | 1.01 |
| 2,2'-Methylene-bis-(4-ethyl-t-butyl-phenol) | 0.19 | 0.53 |

EXAMPLE 5

A portion of flaked diisopropylbenzothiazolesulfenamide is diveded into three samples, 2,6-di-tertiarybutyl paracresol added as an inhibitor as indicated in Table V, and the samples stored at 110°–115° F. Results of original and final assays appear in Table V.

Table V

| 2,6-di-t-butyl-p-cresol (percent) | Percent Diisopropylbenzothiazole sulfenamide | |
|---|---|---|
| | Original Assay | 11 Week Assay |
| None | 99.1 | 93.0 |
| 1.0 | 98.2 | 97.6 |
| 2.5 | 96.6 | 96.0 |

Other sulfenamides are similarly stabilized against decomposition using the inhibitors illustrated by the examples or using other inhibitors within the definition of inhibitor previously set forth.

I claim:
1. A composition comprising a sulfenamide and as a decomposition inhibitor a compound selected from the group consisting of

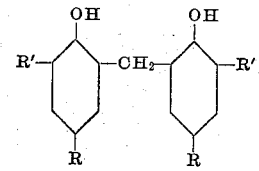

and

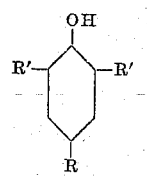

in which R is a lower alkyl radical and R' is a t-alkyl radical.

2. A composition according to claim 1 in which the sulfenamide is a benzothiazolesulfenamide.
3. A composition according to claim 2 in which the sulfenamide is N-oxydiethylenebenzothiazolesulfenamide.
4. A composition according to claim 2 in which the sulfenamide is N,N-diisopropylbenzothiazolesulfenamide.
5. A composition according to claim 1 in which the inhibitor is 2,2' - methylene - bis - (4-methyl-6-t-butyl-phenol).
6. A composition according to claim 1 in which the inhibitor is 2,2'-methylene-bis-(4-ethyl-6-t-butyl-phenol).
7. A composition according to claim 1 in which the inhibitor is 2,6-di-t-butyl-para-cresol.
8. A composition according to claim 1 in which the amount of inhibitor is from 0.5–10% on the weight of the sulfenamide.
9. A method of inhibiting the decomposition of a sulfenamide which comprises adding thereto a compound selected from the group consisting of

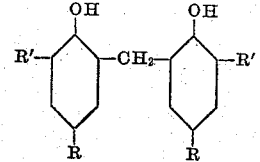

and

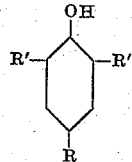

in which R is a lower alkyl radical and R' is a t-alkyl radical.

10. A method according to claim 9 in which the sulfenamide is a benzothiazolesulfenamide.
11. A method according to claim 10 in which the sulfenamide is N-oxydiethylenebenzothiazolesulfenamide.
12. A method according to claim 11 in which the sulfenamide is N,N-diisopropylbenzothiazolesulfenamide.
13. A method according to claim 9 in which the inhibitor is 2,2'-methylene-bis-(4-methyl-6-t-butylphenol).
14. A method according to claim 9 in which the inhibitor is 2,2'-methylene-bis-(4-ethyl-6-t-butylphenol).
15. A method according to claim 9 in which the inhibitor is 2,6-di-t-butyl-para-cresol.
16. A method according to claim 1 in which the amount of inhibitor is from 0.5–10% on the weight of the sulfenamide.

No references cited.